Sept. 4, 1962   H. A. VAN DER VELDEN   3,052,259
DIAPHRAGM ACTUATED SAFETY VALVE
Filed Oct. 7, 1960
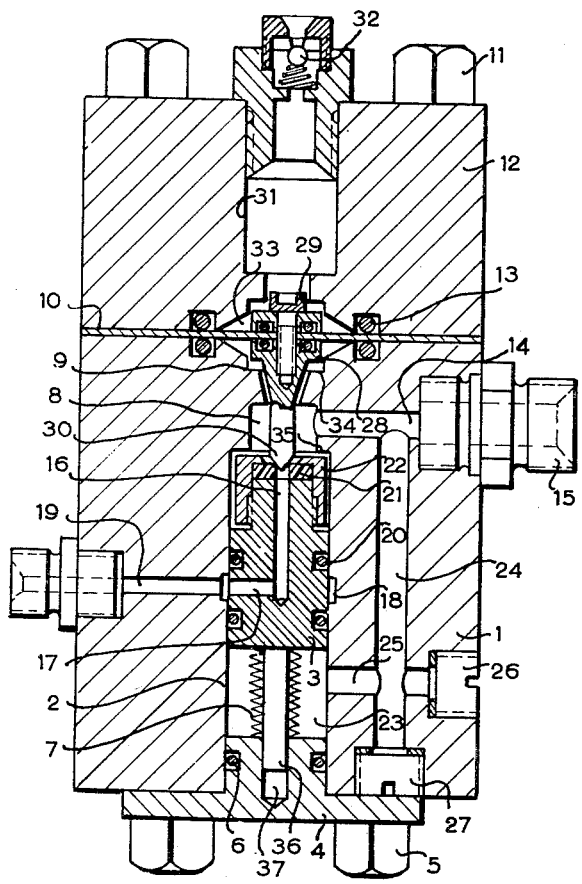
Inventor
Hermanus A. van der Velden
By Cushman, Darby & Cushman
Attorneys

United States Patent Office 3,052,259
Patented Sept. 4, 1962

3,052,259
DIAPHRAGM ACTUATED SAFETY VALVE
Hermanus A. van der Velden, Heerlen, Netherlands, assignor to Stamicarbon N.V., Heerlen, Netherlands
Filed Oct. 7, 1960, Ser. No. 61,256
Claims priority, application Netherlands Oct. 9, 1959
4 Claims. (Cl. 137—510)

The present invention relates to safety valves.

A safety valve has been proposed which is designed so that the valve member is lifted by the inlet fluid pressure acting through the agency of a diaphragm and a valve lever. This construction has the drawback that the force with which the valve member is held on its seating decreases when the pressure of the medium at the valve inlet increases. As a result, the sealing effect of the valve becomes insufficient when the pressure of the medium is slightly below the maximum pressure. If the valve seat or the sealing face of the valve is not perfectly smooth, the medium is liable to escape at a high velocity, with the result that severe erosion of the seating faces will occur. Also, due to the low closing force at high pressures, the valve does not shut until the fluid pressure has dropped considerably below the maximum permissible pressure.

According to the present invention I provide a safety valve which comprises a body with inlet and outlet ports, a valve member, means which exerts or permits control fluid under pressure to exert a closing force on the valve, and means whereby the inlet fluid pressure exerts an opening force on the valve member: and wherein the outlet port seating for the valve member is formed or carried by a floating member which is sealed in a bore communicating on both sides of said member with the inlet port, which said member is formed so that it is subjected by said inlet fluid pressure to a resultant force in the direction of the valve and is movable with the valve over a limited distance when the opening force exerted on the valve member by said inlet fluid pressure exceeds the closing force on said valve member.

The floating valve seating member is preferably formed like a piston with an axial bore, one end of which opens at the seating for the valve member and the other end of which connects with a radial bore leading to the outlet port. As the effective area of such a piston member at its valve seat end is diminished by the valve member area the piston will be subjected to a resultant force directed towards the valve member, the said force being equal to the pressure of the medium multiplied by the surface area of the valve member. If desired the piston may be reduced in outside diameter, between its ends, its narrower end being formed or provided with the valve seat. When the pressure of the medium at the valve inlet increases, the force with which valve member and seating are held together will increase in proportion to the difference in area between the two ends of the piston until the closing force on the valve member itself is overcome.

The difference between the fluid pressure at which the valve member opens and the fluid pressure at which it closes is largely determined by the inertia of the moving parts, and closing force on the valve member is preferably exerted by fluid pressure acting through a diaphragm. A valve so constructed is capable of operating with very little friction, so that the difference between the closing and opening pressures will be very small, and certainly smaller than if a spring is used to close the valve member. It is to be understood however that the use of a spring or springs is not excluded from the present invention. The air cushion behind the diaphragm might be compared to a spring with a very low spring constant. Consequently, when the maximum permissible pressure is exceeded, the valve will open fairly rapidly and close immediately as soon as the pressure has dropped to slightly below the said maximum pressure.

The formation of a valve seat on a floating piston renders the valve less sensitive to wear and also makes it possible to construct the seat of elastic material. Application of such a material, for example a plastic such as polyurethane, in combination with a conical pin as the valve member, gives a perfectly tight sealing whereas when a fixed seat of hard material is used the wedging effect of the conical valve soon causes damage to the seat, resulting in leakage of the valve.

The invention will be further explained with reference to the accompanying drawing which shows a sectional view of one form of safety valve according to the invention, selected by way of example:

The valve comprising a casing 1 having a central bore 2 in which is arranged a floating piston 3. At one end the bore is shut off by a flange 4, which is held against the casing by bolts 5 and sealed by a sealing ring 6. A spring 7 urges the floating piston 3 away from the flange.

Bore 2 connects with a chamber 8 of smaller diameter than the bore and debouching at the upper end of the casing via a port 9, the casing being closed at the top by a diaphragm 10 clamped between casing 1 and cover 12 by means of bolts 11. The diaphragm is sealed by sealing rings 13 provided in the casing.

Chamber 8 is connected to the device to be safeguarded via a bore 14 and a connection 15.

The floating piston has an axial bore 16 which connects with a radial bore 17 which in turn connects with an annular recess 18 formed in the bore 2 and connecting with a bore 19 through which medium can be discharged. On either side of the annular recess 18 the floating piston is sealed in bore 2 by sealing rings 20. The floating piston carries a valve seating 21 made of an elastic plastic material, such as polyurethane, which is fastened to the floating piston by a nut 22. Compartment 23 between the floating piston and the flange connects with bore 14 via the bores 24 and 25. Screwed into these bores are plugs 26 and 27 which seal the bores from the atmosphere.

Attached to diaphragm 10 by means of a bolt 29 is a valve 28. At its lower end the said valve carries a conical pin 30 which engages in the seat 21. Above the diaphragm is a bore 31 which is shut-off by a back-pressure valve 32. Through this back-pressure valve air is pressed into bore 31 at a pressure equal to the maximum permissible pressure of the medium in the device to be safeguarded. The valve body can move a limited distance in a chamber 33 under the control of the diaphragm.

The safety valve described above operates as follows. The diaphragm is pushed down by the pressure in bore 31 until valve body 28 is arrested by the edge 34. When this happens pin 30 engages with seating 21, the floating piston 3 being only a short distance from the end of bore 2 where it opens into chamber 8. When the pressure of the medium in the said device to be safeguarded increases, the pressure in chamber 8 and in chamber 23 under the floating piston also increases. As guide pin 36 on the floating piston is not sealed in bore 37 the pressure of the medium under the piston acts on the whole surface area. The pressure in chamber 8, however, acts only on the surface area of the piston minus that of the bore in the floating piston with the result that the floating piston is pushed upwards by a force equal to the pressure of the medium multiplied by the area of the bore in the floating piston and increased by the force exerted by the spring 7. Consequently, when the pressure of the medium in said device increases, the closing force of the valve increases. If a still sharper pressure increase should be desired, a differential piston may be employed the narrow end of which is directed towards the valve, in which case the transition between the two parts of the piston is preferably arranged at the level of the annular recess 18. The tension of spring 7 is small since the said spring only serves to keep the valve closed when not subjected to pressure and to prevent the floating piston from being displaced by its own weight or by the down flowing liquid when the valve is open. The spring also ensures that the valve and the seating will remain pressed together even if the seating should have become slightly worn.

When the pressure of the medium reaches a predetermined maximum, which is just in excess of the pressure of the compressed air in bore 31, the diaphragm rises together with the valve, the floating piston following over a limited distance until it is arrested by the edge 35. The compression of the air in bore 31 may be neglected as the displacement of the diaphragm is small compared with the volume of the bore. When the maximum pressure is slightly exceeded, this causes the diaphragm to move upwards until valve pin 30 is drawn out of seating 21. The liquid can now escape through bore 16. When the pressure of the medium falls to slightly below the maximum pressure, the diaphragm immediately moves down again and the outlet port is shut off by the valve pin.

The invention is particularly suitable for use in hydraulic devices, such as hydraulic pit props, where the pressure in the device has to be kept below a given value and operation of the safety valve does not produce an appreciable pressure drop in the liquid contained in the device.

The valve above described is suitable for use at pressures of 300 atm. and upwards. The difference between the pressure at which the valve opens and the pressure at which the valve closes amounts to about 1% of the maximum pressure.

What is claimed is:

1. A safety valve which comprises a body with fluid inlet and outlet ports, a valve member movable between a closed position and an open position, means for supplying a control fluid under pressure to one side of said valve member and means operable by said control fluid to exert a closing force on said valve member, means for supplying fluid from said fluid inlet to the other side of said valve member to exert an opening force thereon, said valve member being held in the closed position by said control fluid except when the pressure of fluid from said inlet exceeds the closing force of said control fluid and moves said valve member to its open position, a bore in said body between said inlet and outlet ports, a floating member movable within said bore and sealed therein, said floating member including a passage for fluid from said inlet, one end of said passage discharging into said outlet port within said sealed position, the other end of said passage having a valve seating therein, said valve seating receiving said valve member in its closed position, spaced conduit means opening into said bore and placing both ends of said floating member in open communication with said fluid inlet, said floating member being formed so that it is subjected to a resultant force by said inlet fluid pressure in the direction of said valve member whereby the closing force between said valve member and said valve seating increases as said inlet fluid pressure increases, said floating member being movable with said valve member when the inlet fluid pressure exerted on said valve member exceeds the closing force on said valve member, and means limiting this movement of said floating member.

2. A safety valve according to claim 1 wherein the means whereby the control fluid exerts a closing force on the valve member comprises a diaphragm which is secured to said valve member.

3. A safety valve according to claim 1 wherein the valve member comprises a conical pin and wherein said valve seating is formed from an elastic material.

4. A safety valve according to claim 3 wherein the said valve seating is formed from polyurethane.

References Cited in the file of this patent

UNITED STATES PATENTS 2,591,528     Filstrup _____ Apr. 1, 1952
2,839,078     Lornitzo _____ June 17, 1958